(12) United States Patent
Eshwar et al.

(10) Patent No.: US 10,353,930 B2
(45) Date of Patent: Jul. 16, 2019

(54) GENERATING A TRUST FACTOR FOR DATA IN NON-RELATIONAL OR RELATIONAL DATABASES

(71) Applicant: INTERNATIONAL BUSINESS MACHINES CORPORATION, Armonk, NY (US)

(72) Inventors: Bhavani K. Eshwar, Bangalore (IN); Amit Malla, Bangalore (IN); Soma S. Naganna, Bangalore (IN); Umasuthan Ramakrishnan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 339 days.

(21) Appl. No.: 15/252,282

(22) Filed: Aug. 31, 2016

(65) Prior Publication Data

US 2018/0060370 A1   Mar. 1, 2018

(51) Int. Cl.
*G06F 16/28* (2019.01)
*G06F 16/215* (2019.01)

(52) U.S. Cl.
CPC .......... *G06F 16/288* (2019.01); *G06F 16/215* (2019.01)

(58) Field of Classification Search
CPC ......... G06F 17/30604; G06F 17/30303; G06F 17/3053; G06F 17/30554; G06F 17/30598; G06F 17/30867; G06F 17/30371; G06F 17/30563; G06F 16/288; G06F 16/215
USPC ........................................ 707/751
See application file for complete search history.

(56) References Cited

U.S. PATENT DOCUMENTS

| | | | |
|---|---|---|---|
| 2010/0107244 A1* | 4/2010 | Li ................ | G06F 21/577 726/22 |
| 2013/0204994 A1* | 8/2013 | Deshmukh ...... | H04L 63/0815 709/223 |
| 2014/0279838 A1 | 9/2014 | Tsirogiannis et al. | |
| 2014/0289261 A1* | 9/2014 | Shivakumar ..... | G06Q 10/101 707/748 |
| 2015/0356094 A1 | 12/2015 | Gorelik | |
| 2016/0283952 A1* | 9/2016 | Hall ............... | G06F 17/30867 |

* cited by examiner

*Primary Examiner* — Evan Aspinwall
(74) *Attorney, Agent, or Firm* — Cantor Colburn LLP; Robert Bunker

(57) ABSTRACT

A computer-implemented method includes detecting an update to a record in an entity table of a database. At least one of an age score, a lineage score, and a completeness score for the record is calculated, responsive to the update. A trust factor is calculated, by a computer processor, based on the at least one of the age score, the lineage score, and the completeness score for the record. The trust factor indicates a level of trustworthiness of the record. It is decided whether to use data in the record based on the trust factor.

20 Claims, 3 Drawing Sheets

GENERATING A TRUST FACTOR FOR DATA IN NON-RELATIONAL OR RELATIONAL DATABASES

BACKGROUND

Embodiments of the present invention relate to data trustworthiness and, more specifically, to generating a trust factor for data in relational or non-relational databases.

Apache® Hadoop Database (HBase) is an open-source, distributed, non-relational database system providing Big Data capabilities on top of Hadoop, a Java-based programming framework that supports the processing of large data sets in a distributed computing environment, and the Hadoop Distributed File System.

Being a column-oriented (i.e., key-value) database suited for sparse data sets common in Big Data usage, HBase does not require that a structure, or type, of data to be definitive. Thus, HBase does not support any structured query language. Storage and retrieval of data is based on row keys, each of which uniquely identifies a row. While data in a row can be grouped into column families, which define the arrangement of data, a row need not have data filling all column families of a table.

SUMMARY

According to an embodiment of this disclosure, a computer-implemented method includes detecting an update to a record in an entity table of a database. At least one of an age score, a lineage score, and a completeness score for the record is calculated, responsive to the update. A trust factor is calculated, by a computer processor, based on the at least one of the age score, the lineage score, and the completeness score for the record. The trust factor indicates a level of trustworthiness of the record. It is decided whether to use data in the record based on the trust factor.

In another embodiment, a system includes a memory having computer readable instructions and one or more processors for executing the computer readable instructions. The computer readable instructions include detecting an update to a record in an entity table of a database. Further according to the computer readable instructions, at least one of an age score, a lineage score, and a completeness score for the record is calculated, responsive to the update. A trust factor is calculated based on the at least one of the age score, the lineage score, and the completeness score for the record. The trust factor indicates a level of trustworthiness of the record. It is decided whether to use data in the record based on the trust factor.

In yet another embodiment, a computer program product for determining a trust factor of a record includes a computer readable storage medium having program instructions embodied therewith. The program instructions are executable by a processor to cause the processor to perform a method. The method includes detecting an update to a record in an entity table of a database. Further according to the method, at least one of an age score, a lineage score, and a completeness score for the record is calculated, responsive to the update. A trust factor is calculated based on the at least one of the age score, the lineage score, and the completeness score for the record. The trust factor indicates a level of trustworthiness of the record. It is decided whether to use data in the record based on the trust factor.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Generally, in a relational database, tables within the database are structured based on a schema. Thus, it is simple to determine whether data is missing or does not comply with an expected format. As a result, determining trustworthiness, or reliability, of data in relational databases can be easy. In contrast, data in non-relational databases, such as Apache Hadoop Database (HBase), need not be based on a schema. For instance, multiple data fields can be used to maintain the synonymous data, and no particular structure need be required for that data. Thus, it can be difficult to determine the trustworthiness of data in a non-relational database.

According to some embodiments, a trust system 100 may be integrated into or in communication with a database, such that the trust system 100 may determine a trust factor for each of one or more records in the database. This database may be relational or non-relational, and thus the trust system 100 may operate without reliance on a schema for the data.

Figure 1:
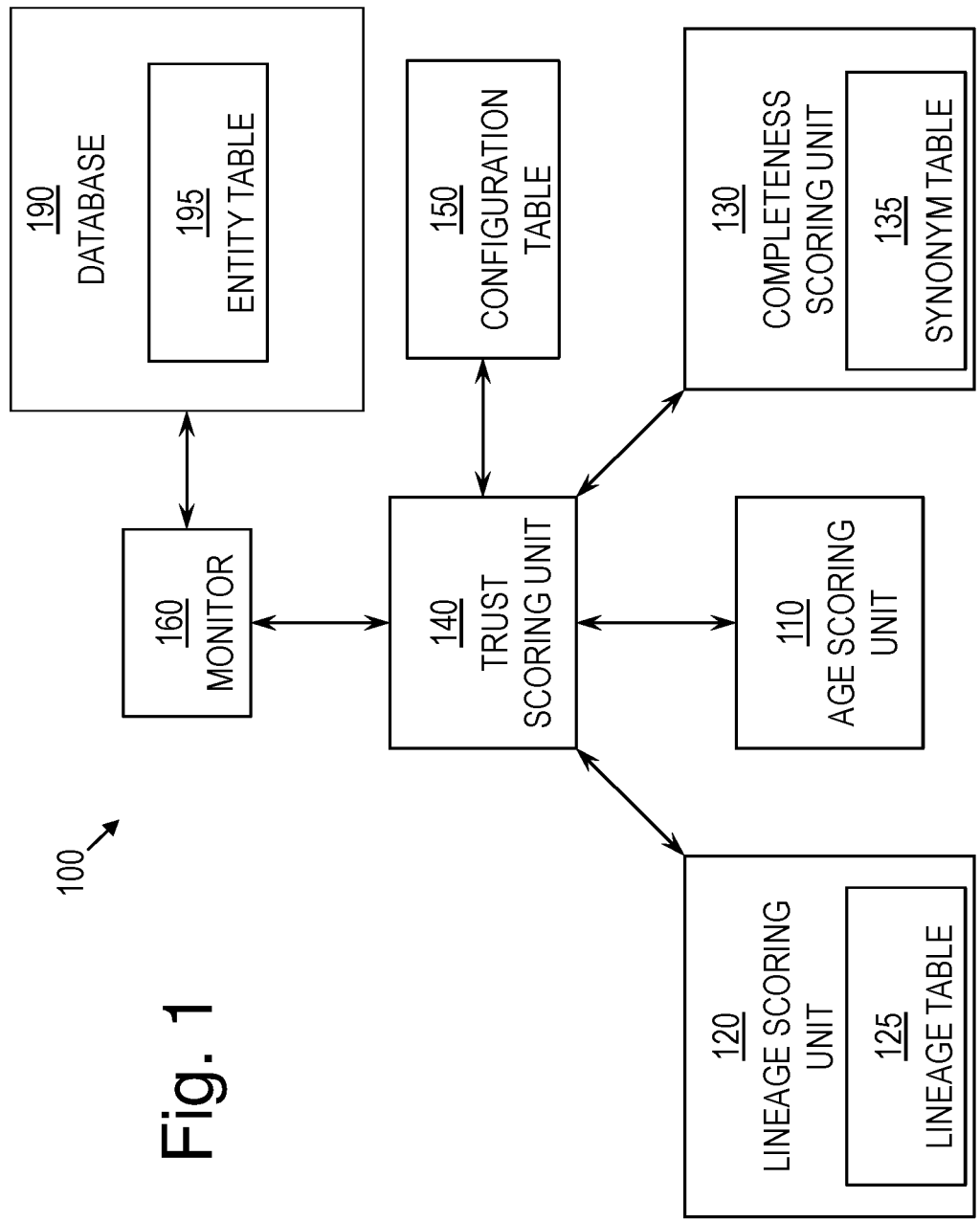
FIG. 1 is a block diagram of a trust system operating on an entity table, according to some embodiments of the present invention.

FIG. 1 is a block diagram of the trust system 100 operating on an entity table 195 in a database 190, according to some embodiments of this disclosure. The database 190 may be a relational database, but need not be. As shown, the trust system 100 may include one or more scoring units, such as, for example, an age scoring unit 110, a lineage scoring unit 120, a completeness scoring unit 130, and a trust scoring unit 140. In some embodiments, the age scoring unit 110 may determine an age score for a record; the lineage scoring unit 120 may determine a lineage score for each record, where that lineage score may be based on a lineage table 125; and the completeness scoring unit 130 may determine a completeness score for a record, where the completeness score may be based on a synonym table 135. The trust scoring unit 140 may determine a trust factor for each record in an entity table 195 based on one or more of the lineage score, the age score, and the completeness score, where the trust factor indicates a level of trustworthiness of the record. Further, a configuration table 150 may determine one or more parameters used in determining the various trust factors of the records in the entity table 195. In some embodiments, the age scoring unit 110, the lineage scoring unit 120, the completeness scoring unit 130, and the trust scoring unit 140 may include hardware software, or a combination of both, and may be designed to perform the tasks described below.

In some embodiments, a monitor 160 may detect when update, such as the addition of a new record or change of an existing record, is made to the entity table 195. When an update is detected, the monitor 160 may update the trust factors of the records as needed.

An entity table 195 may include a row of records, where each record describes and is associated with a particular entity. The data within each row may be arranged in columns, each column representing a field of data. Further, the columns may be grouped into column families, where each such family is made up of fields deemed to be synonyms. Throughout this disclosure, the following example entity table 195 is used to describe various features of the trust system 100:

|  Name CF  |  | Address CF |  | Trust CF | | | |
|---|---|---|---|---|---|---|---|
| | | | | Completeness | Data Age | Lineage | Trust |
| firstName | lastName | street | city | Score | Score | Score | Factor |
| Amit | Smith | EGL | Bangalore | 1 | 0.5 | 1 | 2.5 |
| Soma | | | Bangalore | 0.5 | 0.3 | 0.6 | 1.4 |
| | Lawrence | Manyata | | 0.5 | 1 | 0.3 | 1.8 |
| Jacob | Eshwar | EGL | Bangalore | 1 | 1 | 1 | 3 |

In this entity table 195, the data is arranged into three families, Name CF, Address CF, and Trust CF, where "CF" is an abbreviation for a column family.

Based on an entity table 195, such as the above example table or some other entity table 195, the trust system 100 may calculate an age score for the records. For instance, more specifically, the age scoring unit 110 of the trust system 100 may calculate an age score for each record. Generally, the age score may be indicative of how trustworthy the record is due to the age of the data in the record, such that newer data may be considered more trustworthy. In some embodiments, the age score for a record may be based on the age of the record and may be further based on an established base period. For example, and not by way of limitation, the age score for a first record may be the maximum age across all records, minus the age of the first record, all divided by the base period. In other words, where B represents the base period, G represents the age of the first record, and M represents the maximum age of the records, the age score for the first record may be calculated as (M−G)/B.

For example, the age of a record may be determined by subtracting a timestamp of the last modification to the record from a current time at which the age score is being calculated. For another example, the age of a record may be determined based on (e.g., by averaging) the ages of the data in the various fields of the record. In some embodiments, the base period may be determined by configuration parameters, which may be defined by the configuration table 150 in some embodiments. In some embodiments, the base period for a particular record may be further based on the data source of data in the record, and in that case, the configuration table may include a mapping of data sources to base periods. Thus, with knowledge of the data source of a record, the base period for the record may be determined from the configuration table 150. In some embodiments, the base period may be set, such as by an administrator, to a value representing an expected maximum age across all the records, or to a value representing an age at which data is considered unreliably old.

Following is an example configuration table 150, showing a base period for each combination of column family and data source:

| Attribute | Max Weight | Base Period | Data Source |
|---|---|---|---|
| Name CF | 20 | 10 | Source 1 |
| Address CF | 30 | 5 | Source 1 |
| Name CF | 10 | 5 | Source 2 |
| Address CF | 15 | 5 | Source 2 |

In some embodiments, the trust system 100 may determine the lineage score for a record based on the lineage table 125. For instance, more specifically, the lineage scoring unit 120 of the trust system 100 may calculate a lineage score for each record. The lineage score may reflect the record's trustworthiness due to the lineage of the data in the record. Specifically, in some embodiments, the determination of lineage scores may be made by the lineage scoring unit 120.

Following is an example lineage table 125:

| Data Source | Weight |
|---|---|
| Source 1 | 1 |
| Source 2 | 0.5 |
| Source 3 | 0.7 |
| Source 4 | 0.2 |

The lineage table 125 may map data sources to weights, such that each data source is mapped to a weight. When the entity table 195 is updated with new data, the trust system 100 may have access to the data source providing the new data. For example, and not by way of limitation, the data source may be detected upon receipt of the new data or the data source may be identified in metadata associated with the new data. Having identified the data source, the trust system 100 may determine a weight to be used as the lineage score. This weight may be, for example, the weight to which the data source of the new data is mapped in the lineage table 125. If multiple data sources have contributed to the data in the record, in some embodiments, the trust system 100 may combine the associated weights into a lineage score. For example, and not by way of limitation, the weights to which the various data sources of the record are mapped may be averaged to calculate the lineage score.

In some embodiments, the completeness score of a record may be determined based on one or both of the synonym table 135 and the configuration table 150. For instance, more specifically, the completeness scoring unit 130 of the trust system 100 may calculate a completeness score for each record. The completeness score may indicate how complete the record is or, in other words, how close the record comes to including sufficient data from the various column families.

In some embodiments, the synonym table 135 may maintain one or more column families where the columns, or fields, within a family are deemed synonyms according to the trust system 100. Further, each synonym within a family may be mapped to, or associated with, a weight in the synonym table 135. Following is an example portion of a synonym table 135, specifically showing the synonyms and weights within a single family, Name CF:

| Synonym Name | Weight |
|---|---|
| fName | 10 |
| fullName | 20 |
| firstName | 10 |
| lastName | 10 |
| lName | 10 |

In a synonym table 135, various related fields may be defined as synonyms, with each field given a weight. For instance, in the above example, each synonym is name-related. Further, configuration parameters, which may be given by the configuration table 150, may define a maximum weight for each family of synonyms in the synonym table 135. For example, and not by way of limitation, each family may be associated with a family identifier, and each family identifier may be associated with a maximum weight in the configuration table 150, as shown in the example configuration table 150 provided above. Also as in the example configuration table 150, the maximum weight for a family may be further based on the data source from which data of a record's fields within that family is received.

For instance, in the example configuration table 150 given above, "Name CF" identifies the family shown in the above example synonym table 135, and the maximum weight given to this family is defined as 20 if the data in the fields of the Name CF family came from Source 1, and is defined as 10 if the data in the fields of the Name CF family came from Source 2. In the case where the data in those fields came from multiple data sources, the trust system 100 may have an established mechanism for determining the maximum weight based on the maximum weights given for each data source. For example, and not by way of limitation, the trust system 100 may always use the lowest maximum weight given based on the various data sources contributing to the data in the fields of the family.

The maximum weight for a family may be, or may define, the maximum completeness value assigned to a record based on the inclusion of data within that family. Given the above synonym table 135 and configuration table 150, a record in the entity table 195 may include data in one or more of the fields referenced in the portion of the synonym table 135 identified by Name CF. For instance, a record may have data filled into the fields fName and fullName. The combined weight of these fields, based solely on the synonym table 135 is 30. However, in this example, the configuration table's maximum weight for this family limits the combined weight of such fields to 20. Thus, the completeness value assigned to the record based on this family alone may be 20. More generally, the weight assigned to each record for a given family of synonyms may be the sum of the weights of the fields of that family deemed to be complete in the record, maxed out at the maximum weight allowed as defined by configuration parameters.

A total completeness score for a record may be based on a combination of the various completeness values calculated based on each family given in the synonym table 135. More specifically, for instance, the completeness score may be a weighted average of the various completeness values that are based on the various families in the synonym table 135, where each completeness value is weighted in the weighted average according to the maximum weight allowed for the corresponding family. In some embodiments, only fields appearing in the synonym table 135 may be considered for the purpose of determining the completeness score. For example, given a set of families identified by Name CF and Address CF, a record may be assigned completeness values of, respectively, 20 and 15. The completeness score of this record, given only these two families, may thus be 20+15, divided by the combined maximum weight of these families, which is 50. Thus, in this example, the completeness score of the record is 35/50=0.7.

The trust factor of a record may be based on a combination of the various other scores calculated for the record, such as the age score, the lineage score, and the completeness score. In some embodiments, the trust scoring unit 140 of the trust system 100 may calculate a trust factor for each record. For example, and not by way of limitation, the trust factor may be the sum of those other scores. In some embodiments, the trust factor of a record, as well as the one or more scores on which the trust factor is based, may be stored within the record for convenient access.

In general, the trust factor or one or more scores on which the trust factor is based may be updated by recalculation when data in a record is changed. In some embodiments, this updating may be initiated, or fully performed, by the monitor 160. The monitor 160 may detect an update to a row and, responsive to that update, may recalculate the one or more scores and the trust factor. For example, and not by way of limitation, the monitor 160 may be a co-processor or an observer of Hadoop, and may update the one or more scores and the trust factor through a co-process hook point of HBase.

The trust factor of a record may be an indication of how trustworthy the data in that record is. In some embodiments, this trust factor may be taken into consideration by a human or application when deciding how or whether to use the data in the record. For example, and not by way of limitation, an application using the entity table may automatically skip, and thus not use, records having trust factors below an established threshold. For another example, trust factors may be used to remediate duplicate records, such as customer or client records. When records are deemed to be duplicates, these records may be merged, and where data between them conflicts, the conflicting data in the record with a better (e.g., higher) trust factor may be returned, while the conflicting data in the other record may be discarded.

In some embodiments, the trust system 100 may modify one or more of the tables, such as the synonym table 135, the lineage table 125, or the configuration table 150, from time to time based on historical data. In other words, the trust system 100 may learn based on experience. As a result of modifying these tables, the results of calculating the age score, lineage score, completeness score, or trust factor for a record may change. In some embodiments operating on Hadoop databases 190, this learning may be performed by way of a MapReduce function, which may be implemented to recalculate the values and weights in one or more of the above-described tables. For example, and not by way of limitation, if it is determined that most records being used from the entity table 195 have value in a particular field, such as the fullName field, then the weight of that field in the synonym table 135 may be increased.

Figure 2:
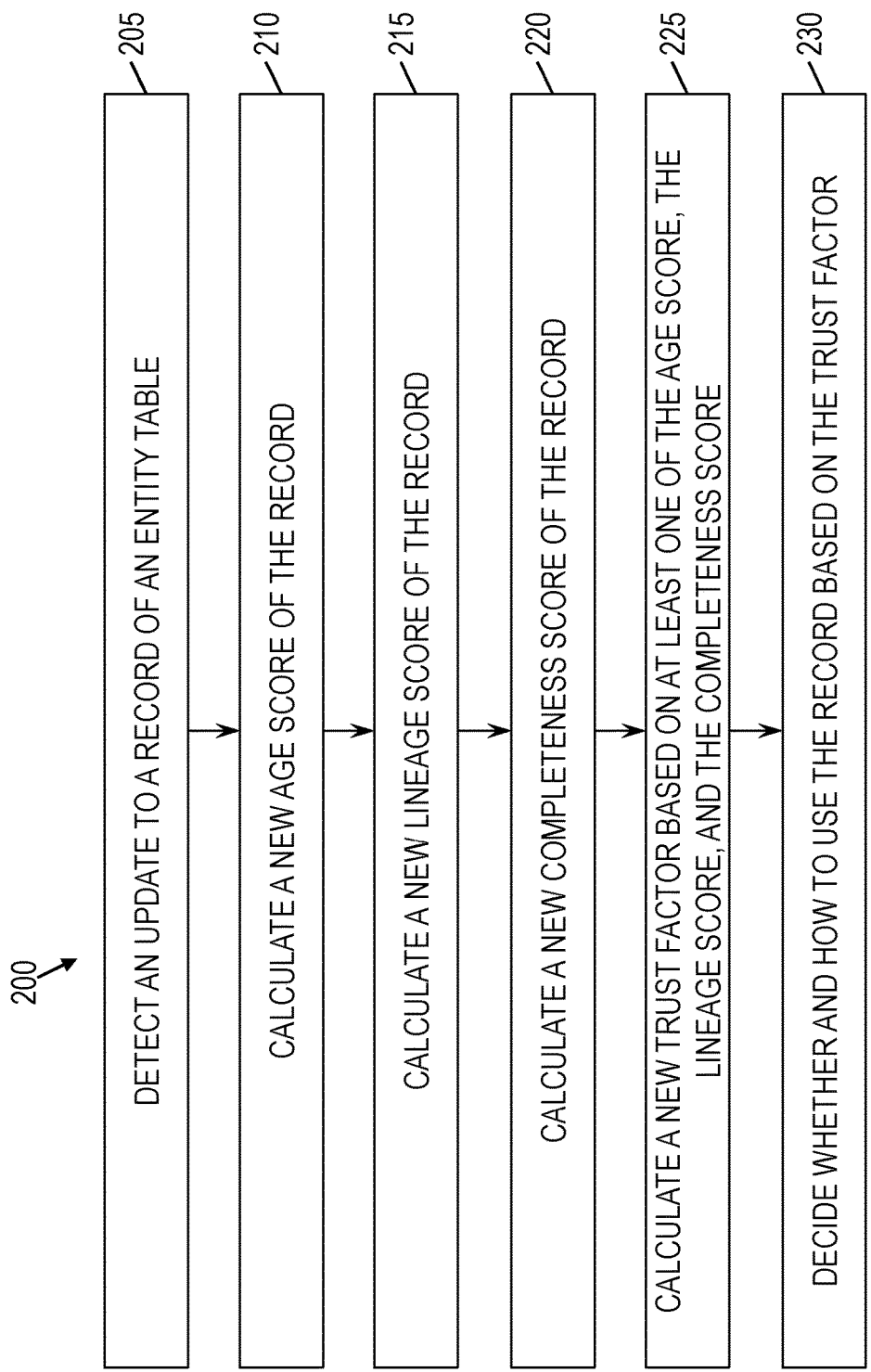
FIG. 2 is a flow diagram of a method for determining a trust factor, according to some embodiment of the present invention.

FIG. 2 is a flow diagram of a method 200 for determining a trust factor of a record, according to some embodiments. As shown, at block 205, the monitor 160 may detect an update to a record in the entity table 195. At block 210, given the updated record, the trust system 100 may calculate a new age score of the record, and may store the new age score in the record. At block 215, given the updated row, the trust system 100 may calculate a new lineage score of the record, and may store the new lineage score in the record. At block 220, the trust system 100 may calculate a new completeness score of the record, and may store the completeness score in the record. It will be understood that various blocks in this method 200 may be performed in a different order than described here. For example, blocks 210 through 220 may be reordered. At block 225, the trust system 100 may calculate a new trust factor for the row, based on at least one of the age score, the lineage score, and the completeness score. At block 230, an application may decide whether or how to use the record based on the trust factor of the record.

Figure 3:
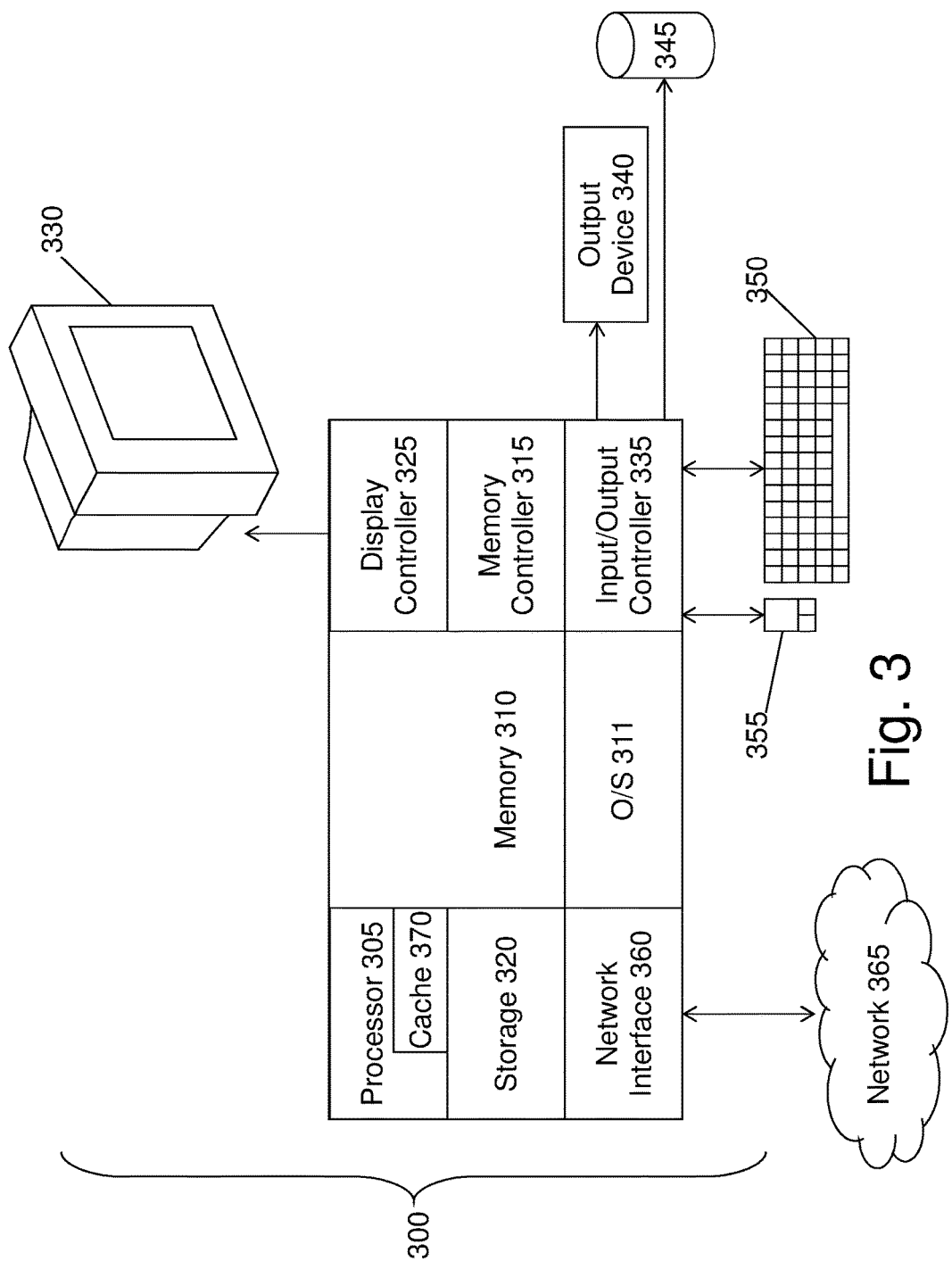
FIG. 3 is a block diagram of a computer system for implementing some or all aspects of the trust system, according to some embodiments of the present invention.

FIG. 3 illustrates a block diagram of a computer system 300 for use in implementing a trust system 100 or method according to some embodiments. The trust systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the trust systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Trust systems 100 and methods according to this disclosure may be embodied, in whole or in part, in computer program products or in computer systems 300, such as that illustrated in FIG. 3.

Technical effects and benefits of some embodiments include the ability to measure trust and thereby determine a trust factor that effectively reflects the reliability of data in non-relational or relational databases 190. Specifically, in some embodiments, the trust system 100 may calculate a trust factor that is based on the age, lineage, and completeness of data, which are characteristics that may be known regardless of whether the data is stored in a relational database 190.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting, by a monitor, an update to a record in an entity table of a database;
   wherein the entity table comprises a plurality of records, each having a plurality of columns, wherein each record of the entity table describes a corresponding entity;
   calculating at least one of an age score, a lineage score, and a completeness score for the record, responsive to the update;
   calculating, by a computer processor, a trust factor of the record based on the at least one of the age score, the lineage score, and the completeness score for the record, wherein the trust factor indicates a level of trustworthiness of the record;
   wherein the trust factor of the record is calculated based at least in part on a configuration table, which defines one or more configuration parameters used to determine the at least one of the age score, the lineage score, and the completeness score, and wherein the one or more configuration parameters comprise at least one of a base period for calculating a plurality of age scores for the entity table and a maximum weight allowed for calculating a plurality of completeness scores for the entity table; and
   deciding whether to use data in the record based on the trust factor.

2. The computer-implemented method of claim 1, wherein the database is a non-relational database.

3. The computer-implemented method of claim 1, wherein the calculating at least one of the age score, the lineage score, and the completeness score for the record comprises calculating the age score for the record, and wherein the calculating the age score for the record comprises:
   determining an age of the record;
   identifying a maximum age of a plurality of records in the entity table;
   calculating the age score of the record based on the age of the record and the maximum age of the plurality of records.

4. The computer-implemented method of claim 1, wherein the calculating at least one of the age score, the lineage score, and the completeness score for the record comprises calculating the lineage score for the record, and wherein the calculating the lineage score for the record comprises:
   identifying a data source of the record;
   identifying a weight associated with the data source; and
   determining the lineage score based on the weight associated with the data source.

5. The computer-implemented method of claim 1, wherein the calculating at least one of the age score, the lineage score, and the completeness score for the record comprises calculating the completeness score for the record, and wherein the calculating the completeness score for the record comprises:
   establishing a synonym table to define families of related columns in the entity table, wherein the synonym table assigns a weight to each column with each family of related columns;
   identifying a first family of columns in the entity table, based on the synonym table, wherein the first family of columns comprises a first set of columns deemed to be synonyms to one another;
   identifying, based on the synonym table, a corresponding weight for each column in the first set of columns of the first family;
   determining which of the first set of columns are filled in the record;
   calculating the completeness score based on the corresponding weight for each of the first set of columns that are filled in the record.

6. The computer-implemented method of claim 5, wherein the calculating the completeness score for the record comprises:
   identifying a second family of columns in a synonym table, wherein the second family of columns comprises a second set of columns deemed to be synonyms to one another, wherein the second family is distinct from the first family;
   identifying a corresponding weight for each column in the second set of columns of the second family; and
   determining which of the second set of columns are filled in the record;
   wherein the calculating the completeness score based on the corresponding weight for each of the first set of columns that are filled in the record further comprises basing the completeness score on the corresponding weight for of the second set of columns that are filled in the record.

7. The computer-implemented method of claim 1, wherein the calculating at least one of the age score, the lineage score, and the completeness score for the record is based on a configuration table, and further comprising:
   modifying the configuration table based on historical use of the entity table.

8. The computer-implemented method of claim 1, wherein the database is a non-relational database, the computer-implemented method further comprising:

determining that a first trust factor of the record of the non-relational database is higher than a second trust factor of a second record of the non-relational database; and merging the record of the non-relational database and the second record of the non-relational database, based on a determination that the second record is a duplicate of the record, by resolving a conflict between the record and the second record in favor of the record, based on the first trust factor being higher than the second trust factor.

9. A system comprising:

a memory having computer readable instructions; and one or more processors for executing the computer readable instructions, the computer readable instructions comprising:

detecting an update to a record in an entity table of a database;

wherein the entity table comprises a plurality of records, each having a plurality of columns, wherein each record of the entity table describes a corresponding entity;

calculating at least one of an age score, a lineage score, and a completeness score for the record, responsive to the update;

calculating a trust factor of the record based on the at least one of the age score, the lineage score, and the completeness score for the record, wherein the trust factor indicates a level of trustworthiness of the record;

wherein the trust factor of the record is calculated based at least in part on a configuration table, which defines one or more configuration parameters used to determine the at least one of the age score, the lineage score, and the completeness score, and wherein the one or more configuration parameters comprise at least one of a base period for calculating a plurality of age scores for the entity table and a maximum weight allowed for calculating a plurality of completeness scores for the entity table; and deciding whether to use data in the record based on the trust factor.

10. The system of claim 9, wherein the database is a non-relational database.

11. The system of claim 9, wherein the calculating at least one of the age score, the lineage score, and the completeness score for the record comprises calculating the age score for the record, and wherein the calculating the age score for the record comprises:

determining an age of the record;

identifying a maximum age of a plurality of records in the entity table;

calculating the age score of the record based on the age of the record and the maximum age of the plurality of records.

12. The system of claim 9, wherein the calculating at least one of the age score, the lineage score, and the completeness score for the record comprises calculating the lineage score for the record, and wherein the calculating the lineage score for the record comprises:

identifying a data source of the record;

identifying a weight associated with the data source; and determining the lineage score based on the weight associated with the data source.

13. The system of claim 9, wherein the calculating at least one of the age score, the lineage score, and the completeness score for the record comprises calculating the completeness score for the record, and wherein the calculating the completeness score for the record comprises:

identifying a first family of columns in a synonym table, wherein the first family of columns comprises a first set of columns deemed to be synonyms to one another;

identifying a corresponding weight for each column in the first set of columns of the first family;

determining which of the first set of columns are filled in the record;

calculating the completeness score based on the corresponding weight for each of the first set of columns that are filled in the record.

14. The system of claim 13, wherein the calculating the completeness score for the record comprises:

identifying a second family of columns in a synonym table, wherein the second family of columns comprises a second set of columns deemed to be synonyms to one another, wherein the second family is distinct from the first family;

identifying a corresponding weight for each column in the second set of columns of the second family; and determining which of the second set of columns are filled in the record;

wherein the calculating the completeness score based on the corresponding weight for each of the first set of columns that are filled in the record further comprises basing the completeness score on the corresponding weight for of the second set of columns that are filled in the record.

15. The system of claim 9, wherein the calculating at least one of the age score, the lineage score, and the completeness score for the record is based on a configuration table, and further comprising:

modifying the configuration table based on historical use of the entity table.

16. A computer program product for determining a trust factor of a record, the computer program product comprising a computer readable storage medium having program instructions embodied therewith, the program instructions executable by a processor to cause the processor to perform a method comprising:

detecting an update to a record in an entity table of a database;

wherein the entity table comprises a plurality of records, each having a plurality of columns, wherein each record of the entity table describes a corresponding entity;

calculating at least one of an age score, a lineage score, and a completeness score for the record, responsive to the update;

calculating a trust factor of the record based on the at least one of the age score, the lineage score, and the completeness score for the record, wherein the trust factor indicates a level of trustworthiness of the record;

wherein the trust factor of the record is calculated based at least in part on a configuration table, which defines one or more configuration parameters used to determine the at least one of the age score, the lineage score, and the completeness score, and wherein the one or more configuration parameters comprise at least one of a base period for calculating a plurality of age scores for the entity table and a maximum weight allowed for calculating a plurality of completeness scores for the entity table; and deciding whether to use data in the record based on the trust factor.

17. The computer program product of claim 16, wherein the calculating at least one of the age score, the lineage score, and the completeness score for the record comprises calculating the age score for the record, and wherein the calculating the age score for the record comprises:
  determining an age of the record;
  identifying a maximum age of a plurality of records in the entity table;
  calculating the age score of the record based on the age of the record and the maximum age of the plurality of records.

18. The computer program product of claim 16, wherein the calculating at least one of the age score, the lineage score, and the completeness score for the record comprises calculating the lineage score for the record, and wherein the calculating the lineage score for the record comprises:
  identifying a data source of the record;
  identifying a weight associated with the data source; and
  determining the lineage score based on the weight associated with the data source.

19. The computer program product of claim 16, wherein the calculating at least one of the age score, the lineage score, and the completeness score for the record comprises calculating the completeness score for the record, and wherein the calculating the completeness score for the record comprises:
  identifying a first family of columns in a synonym table, wherein the first family of columns comprises a first set of columns deemed to be synonyms to one another;
  identifying a corresponding weight for each column in the first set of columns of the first family;
  determining which of the first set of columns are filled in the record;
  calculating the completeness score based on the corresponding weight for each of the first set of columns that are filled in the record.

20. The computer program product of claim 16, wherein the calculating at least one of the age score, the lineage score, and the completeness score for the record is based on a configuration table, and further comprising:
  modifying the configuration table based on historical use of the entity table.

* * * * *